Oct. 20, 1959 K. SCHLESINGER 2,909,595

COLOR TELEVISION RECEIVER

Original Filed Aug. 23, 1954 2 Sheets-Sheet 1

INVENTOR.
Kurt Schlesinger
BY
Mueller & Aichele
Attys.

INVENTOR.
Kurt Schlesinger
BY
Mueller & Aichele
Attys.

United States Patent Office 2,909,595
Patented Oct. 20, 1959

2,909,595

COLOR TELEVISION RECEIVER

Kurt Schlesinger, La Grange, Ill., assignor to Motorola, Inc., Chicago, Ill., a corporation of Illinois Continuation of application Serial No. 451,344, August 23, 1954. This application April 22, 1958, Serial No. 731,576

12 Claims. (Cl. 178—5.4)

The present invention relates to color television receivers and more particularly to an improved color television receiver for utilizing the present day standardized color television signal. This application is a continuation of application Serial No. 451,344 filed August 23, 1954, now abandoned.

In order to achieve compatibility with existing monochrome television receivers the Federal Communication Commission has standardized for color television, a color television signal which includes a luminance component containing sufficient monochrome information for black-and-white reproduction and which also includes chrominance components containing additional information for color reproduction.

The color television signal is formed at the transmitter by deriving separate color video signals from a suitable picture converting means, and these video signals represent various primary colors of the scene to be televised. The color video signals are combined in selected proportions to constitute the luminance signal component (Y) of the color television signal, and this signal component is combined with line and field synchronizing components to form a composite signal which is amplitude modulated on the television carrier wave.

The color video signals are further mixed with the luminance signal component to form a series of color-difference signals each bearing distinct chroma information. These color-difference signals are amplitude modulated at various phase angles on a chroma subcarrier, and the modulated carrier is amplitude modulated on the television carrier wave. Fig. 2 of the attached drawings shows the phase relation between the various color difference signals that are modulated on the chroma subcarrier in the present day standardized color television signal. Namely, the blue $(b-y)$ color-difference signal and the red $(r-y)$ color-difference signal are modulated on the subcarrier in phase quadrature, and the green $(g-y)$ color-difference signal is in effect modulated on the subcarrier at a phase angle of 125° to the $(b-y)$ color-difference signal. As is well-known, the $(g-y)$ color-difference signal can be reconstituted at the receiver from the other two color-difference signals and is not actually transmitted in the color television signal.

The color television signal also includes bursts of a reference signal which has the same frequency as the chroma subcarrier and is in phase oposition with the $(b-y)$ color-difference signal, as shown in Fig. 2. These bursts are impressed upon successive line blanking pulses in the color television signal immediately following the respective line synchronizing pulses pedestalled on the blanking pulses.

It is usual in color television receivers, constructed to utilize the color television signal discussed above, to provide a luminance channel in which the luminance signal is selected and amplified, and also to provide a chrominance channel in which the chroma subcarrier is demodulated to recover the $(r-y)$ and $(b-y)$ color-difference signals. These color-difference signals are matrixed in prior art receivers to obtain the $(g-y)$ color-difference signal, and the three color-difference signals are matrixed with the luminance (Y) signal to derive the *b*, *g* and *r* color signals for color reproduction.

The color demodulators in the chrominance channel respond to a reference signal, generated in the receiver and phased with the color bursts, to produce in each instance the modulation of the chroma subcarrier that is in phase with the reference signal in a particular demodulator. In prior art receivers, the chroma subcarrier is usually applied to a red demodulator and to a blue demodulator, and the reference signal is applied directly to the latter and through a phase-quadrature network to the former, to enable the demodulators to develop respectively the $(r-y)$ and $(b-y)$ color-difference signals.

Patent No. 2,885,467, which issued May 5, 1959 to the present inventor, and which is assigned to the present assignee, discloses and claims various types of pulsed envelope detectors for color signals. Among these were grid controlled single ended detectors which offer adequate color fidelity and linearity as well as high gain. The system of the present invention utilizes the combination of those detectors with a delayed color-signal input, but synchronous cathode drive. For the delay of the color signals, a color memory is used which consists of a low impedance delay line of critical electrical length for which several designs are disclosed.

A color decoder such as that outlined above is simple to operate because it requires no critical phase adjustments, provides an efficient drive for the pulsed envelope detectors, and is an efficient and economical color decoder.

A more general object of the present invention is to provide an improved color television receiver for utilizing the color television signal discussed previously herein, and which receiver is constructed to use relatively simple circuitry and relatively few component parts.

A further object of the invention is to provide such an improved television receiver that operates efficiently to reproduce the color television signal in full color, and yet is relatively simple in its construction and economical in cost.

Yet another object of the invention is to provide such an improved color television receiver in which all the various color-difference signal components are recovered independently to allow independent adjustment of each of the components.

Yet another object of the invention is to provide such an improved color television receiver in which the various color components that are to be applied to the image reproducer of the receiver are dervied in an improved and simplified manner to have the proper magnitude and composition.

A feature of the invention is the provision of an improved color television receiver which includes a color memory or delay line that functions as a low-impedance source to feed the chroma subcarrier to various chroma demodulators, and in which the color reference signal is applied with like phase to all the demodulators; so that the varying load of the demodulators on the subcarrier and reference signal sources does not affect the recovery of the color-difference signals to any noticeable extent.

Another feature of the invention is the provision of an improved color television receiver in which the derivation of the color signals is accomplished by a relatively simple color memory line, demodulating means and matrix network, with relatively simple circuitry for relatively low costs of construction.

Yet another feature of the invention is the provision of such an improved color television receiver in which a separate demodulator is provided for demodulating the components of the red and blue color-difference modulations of the chroma subcarrier to derive the green color difference signal; and in which independent adjustments for the red, green and blue color-difference signals are provided.

Another feature of the invention is the provision of such an improved color television receiver that includes separate demodulators for the red, green and blue color-difference signals; and individual matrixes from each demodulator to the luminance channel for deriving the various color signals, with each matrix having a variable tap connected to provide an efficient adjustment for each of the color signals.

The above and other features of the invention which are believed to be new are set forth with particularity in the appended claims. The invention itself, however, together with further objects and advantages thereof may best be understood by reference to the following description when taken in conjunction with the accompanying drawings in which:

Figures 2, 3A, 3B, 3C, 4, 5:
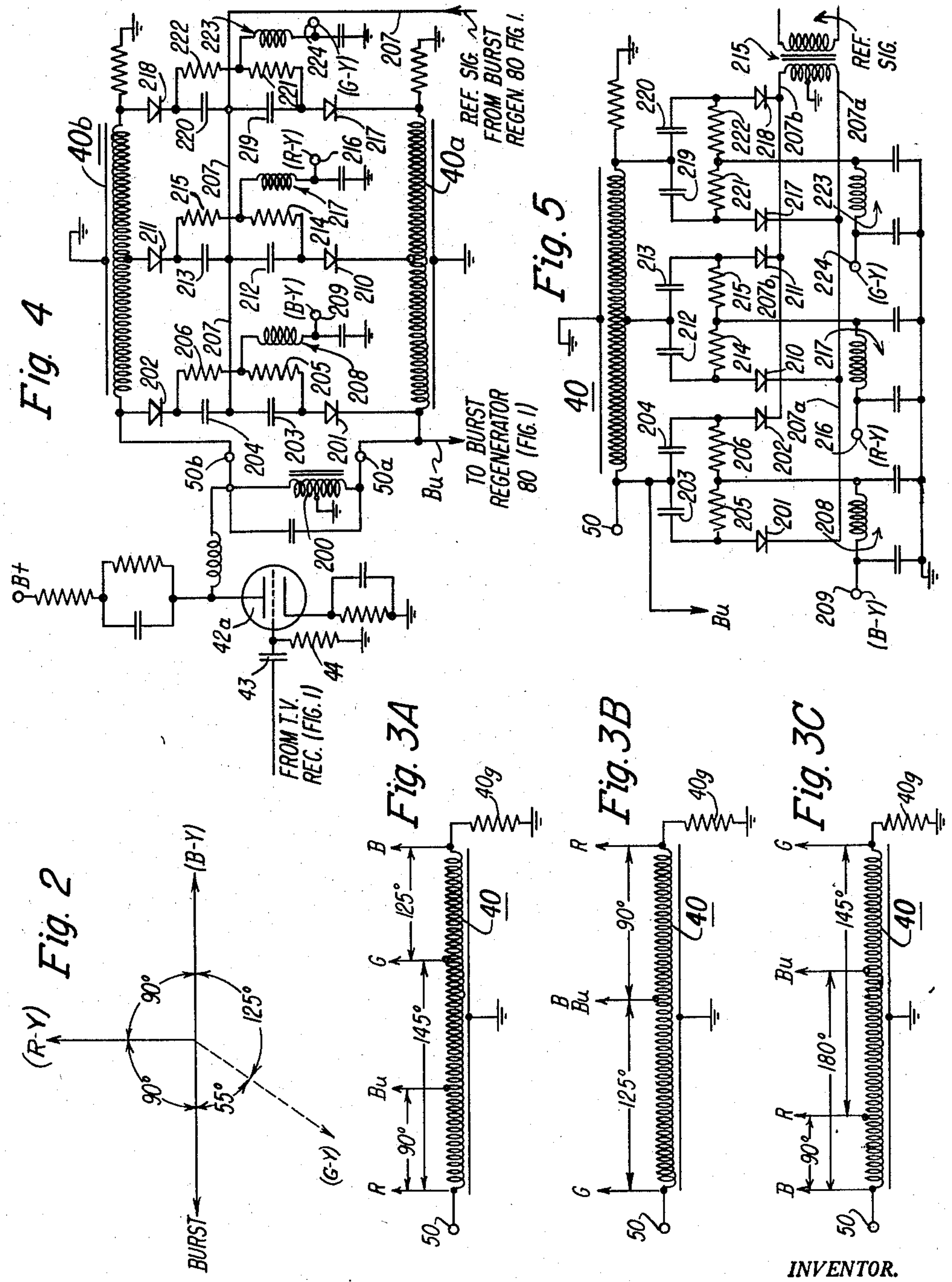
Fig. 2 is the phase diagram referred to previously herein showing the relation of the various color difference signals and the color reference burst on the chroma subcarrier.

Fig. 3*a*–3*c* show various types of color memory lines that may be used in the receiver; and, Figs. 4 and 5 show modifications of a portion of the color receiver of the invention.

The invention provides a color television receiver for utilizing a color television signal which includes a chrominance subcarrier component having a selected frequency and modulated by a plurality of different color-difference signal components each bearing a selected phase relation with respect to one another, and which color television signal further includes a luminance signal component and bursts of a reference component having the frequency of the chrominance subcarrier and having a selected phase relative to the color-difference signal components.

The receiver includes a detector for demodulating the color television signal, a luminance channel coupled to the detector for translating the luminance signal component, and a chrominance channel coupled to the detector for selecting and translating the reference bursts and the chrominance subcarrier component. A plurality of chroma demodulators are included in the chrominance channel, and each of the chroma demodulators is responsive to a color reference signal to recover a particular one of the color-difference signal components which has a phase coinciding with the phase of the reference signal in that particular demodulator. The receiver also includes a reference signal source which is responsive to the reference bursts of the color television signal for generating a reference signal having the frequency and phase of the reference bursts, and means for impressing the reference signal from the source on to the chroma demodulators. A color memory or delay line is included in the chrominance channel, and the reference bursts and chrominance subcarrier are translated through this line. A selected point on the line is connected to the reference signal source so as to supply the reference bursts to the source and establish a selected phase relation between the reference signal and the color-difference signal components in each demodulator. Other points on the line are connected to respective ones of the chroma demodulators so that the phase of different ones of the color-difference signal modulation components of the chrominance subcarrier coincides with the phase of the reference signal in different ones of the chroma demodulators. Potentiometer mixing means are connected to the chroma demodulators to combine the luminance signal component translated by the luminance channel with the respective color-difference signal components produced by the chroma demodulators so as to provide a plurality of distinct color video signals. The color video signals are then impressed on the reproducing means of the receiver to enable the reproducer to reproduce the televised scene in full color.

Figure 1:
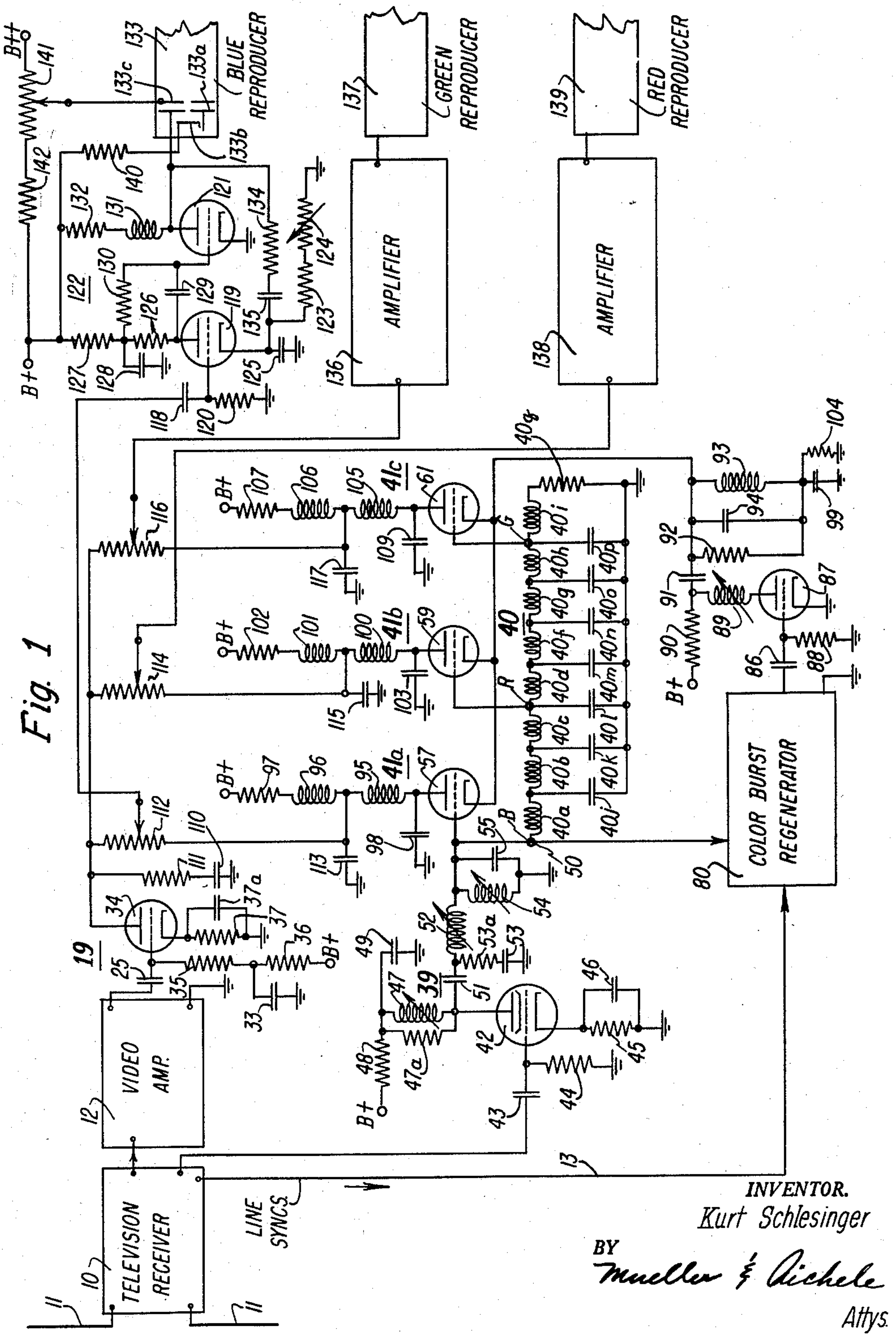
Fig. 1 shows a television receiver constructed in accordance with the invention.

The color television system of Fig. 1 includes a receiver portion 10 having input terminals connected to an appropriate antenna 11. The unit 10 includes the usual radio frequency amplifier, first detector, intermediate frequency amplifier, second detector, and sweep stages. Unit 10 is coupled to the luminance channel of the receiver, and the luminance channel includes a first video amplifier 12 and a second video amplifier 19.

The video amplifier 12 is coupled through a capacitor 25 to the control electrode of an electron discharge device 34, the latter device constituting the video amplifier 19. The control electrode for device 34 is connected to the positive terminal B+ through a pair of resistors 35, 36; the junction of these resistors being by-passed to ground through a capacitor 33. The cathode of device 34 is connected to ground through a resistor 37 shunted by a capacitor 38.

The luminance channel formed by video amplifiers 12, 19 is adapted to translate the luminance component of the color television signal and, for that reason, the video amplifiers are of the wide-band type and have a pass band of from 0–4 megacycles for the present-day standardized color television signal.

The unit 10 is also coupled to the chrominance channel of the receiver which includes a band-pass amplifier 39, a color memory or delay line 40 and three chroma demodulators **41*a*, 41*b*, 41*c*. The band-pass amplifier 39 includes an electron discharge device 42 having a control electrode coupled through a capacitor 43 to an output terminal of unit 10, with the control electrode being connected to ground through a resistor 44 which forms a high-pass filter with capacitor 43. The cathode of device 42 is connected to ground through a resistor 45 shunted by a capacitor 46, and the anode is connected to the positive terminal B+ through an inductance coil 47 and a load resistor 48, coil 47 being shunted by a damping resistor 47*a*. The junction of coil 47 and resistor 48 is coupled to ground through a capacitor 49. The anode is coupled to the input terminal 50 of color memory line 40 through a capacitor 51 and inductance coil 52. The junction of capacitor 51 and coil 52 is coupled to ground through a series connected resistor 53*a* and a capacitor 53; and the junction of coil 52 and terminal 50 is coupled to ground through an inductance coil 54 shunted by a capacitor 55. The elements 47, 49, 51—55** form a triple tuned transformer band-pass network having a pass band of 2.5–4 megacycles to select the chroma subcarrier and the reference bursts.

The color memory line 40 includes a series of inductance coils **40*a*—40*i* connected in series with their junctions coupled to ground through a corresponding series of capacitors 40*j*—40*p*. The line is terminated in its characteristic impedance by a resistor 40*q*. The band-pass network 47, 49, 51—55 is matched with the input impedance of line 40** for maximum power transfer to the line in the frequency range of the band-pass network.

The input terminal 50 of the color memory line 40 is directly connected to the control electrode of an electron discharge device 57 which is connected to form the blue demodulator **41*a*. An intermediate point on line 40, at the junction of coils 40*c*, 50*d* and capacitor 40*l*, is connected to the control electrode of an electron discharge device 59 constituting the red demodulator 41*b*. A second point on the line 40, at the junction of coils 40*h*, 40*i* and capacitor 40*p*, is connected to the control electrode of an electron discharge device 61 forming the green demodulator 41*c***.

Unit 10 supplies a series of pulses corresponding to the line synchronizing pulses over line 13 to a color burst regenerator 80 of any well known construction, such as a ringing crystal or A.F.C. circuit. Input terminal 50 of delay line 40 is also coupled to the regenerator to supply the reference bursts thereto. The output terminals of unit 80 are coupled respectively to ground and through a capacitor 86 to the control electrode of an electron discharge device 87, the control electrode being connected to ground through a resistor 88. The cathode of device 87 is connected to ground, and the anode of the device is connected to the positive terminal B+ through a variable inductance coil 89 and a resistor 90. The junction of coil 89 and resistor 90 is connected through a capacitor 91 and a resistor 92 to the upper end of a biasing network including a resistor 104 shunted by a capacitor 99 and connected to ground. The junction of capacitor 91 and resistor 92 is connected to the bias network through an inductance coil 93 shunted by a capacitor 94. The junction of capacitor 91 and resistor 92 is connected to the cathodes of the color demodulator discharge devices 57, 59 and 61.

The anode of device 57 is connected to the positive terminal B+ through a constant K low pass network including a pair of inductance coils 95, 96 and a terminating resistor 97, and capacitors 98 and 113 coupled to ground. The anode of device 59 is connected to the positive terminal B+ through a constant K low pass network including a pair of inductance coils 100, 101 and through a resistor 102, and capacitors 103 and 115 coupled to ground. The anode of device 61 is connected to the positive terminal B+ through a constant K low pass network including a pair of inductance coils 105, 106 and through a resistor 107, and capacitors 109, 117 coupled to ground.

The anode of device 34 in video amplifier 19 is coupled to ground through a resistor 111 and a capacitor 110. The junction of the anode and resistor 111 is coupled through a resistor 112 to the common junction of coils 95 and 96, which junction is bypassed to ground through capacitor 113. The common junction of resistors 111 and 112 is coupled to the common junction of coils 100 and 101 through a resistor 114, which junction is bypassed to ground through capacitor 115. The common junction of resistors 111 and 112 is also coupled to the common junction of coils 105 and 106 through a resistor 116, which common junction is bypassed to ground through capacitor 117. Resistor 112 has a variable tap thereon which is coupled through a capacitor 118 to the control electrode of an electron discharge device 119, this control electrode being connected to ground through a resistor 120. Device 119 in conjunction with an electron discharge device 121 constitutes the blue video signal amplifier 122 of the receiver. The cathode of device 119 is connected to ground through a resistor 123 and a variable resistor 124, these resistors being shunted by a capacitor 125. The anode of device 119 is connected to the positive terminal B+ through a pair of resistors 126, 127, whose common junction is bypassed to ground through a capacitor 128. The anode of device 119 is coupled through a capacitor 129 to the control electrode of discharge device 121, and the control electrode is connected to the junction of resistors 126, 127 through a resistor 130. The cathode of device 121 is connected to ground and the anode of the device is connected to the positive terminal B+ through an inductance coil 131 and a resistor 132. The anode is further connected to the control electrode 133*a* of a cathode ray image reproducing device 133 which is constructed to reproduce a blue image. The anode of device 121 is further coupled to the cathode of device 119 through a resistor 134 and a capacitor 135. The cathode 133*b* of reproducer 133 is connected through a resistor 140 to the positive terminal B+. The accelerating electrode 133*c* of reproducer 133 is connected to a movable tap on resistor 141; resistor 141 and a further resistor 142 being connected as a potentiometer between the positive terminal B+ and a terminal B++ of higher positive potential.

Resistor 116 has a variable tap thereon which is coupled to an amplifier 136 and amplifier 136 may be connected in the same manner as amplifier 122 and constitutes the amplifier for the green video signal. Amplifier 136 is coupled, in a manner similar to the coupling of amplifier 122, to a cathode-ray image-reproducing device 137 which is constructed to reproduce a green image.

Resistor 114 has a variable tap thereon which is coupled to an amplifier 138, the latter amplifier may also be connected in the same manner as amplifier 122 and it constitutes the amplifier for the red video signal. Amplifier 138 is coupled, in the same manner as amplifier 122, to a cathode-ray image reproducing device 139 which is constructed to reproduce a red image. As is well known to the art, reproducing devices 133, 137 and 139 may be incorporated as separate electron guns within a single envelope.

When a color television signal of the composition discussed previously herein is intercepted by antenna 11, such a signal is amplified and demodulated in unit 10. The demodulated signal is supplied to video amplifier 12 in the luminance channel, wherein it is amplified and applied to video amplifier 19 in which it is further amplified. As previously noted, the video amplifiers 12 and 19 are of the wide-band type and the luminance channel translates a composite video signal which includes the luminance signal component (Y).

The control electrode of device 34 is returned to the positive terminal B+, so that the synchronizing components (which extend in the positive-going direction) drive the control electrode positive with respect to the cathode and are suppressed. Because of this, the composite video signal appearing at the output of the luminance channel contains the line and field blanking components but not the associated synchronizing componets. This removal of the high amplitude synchronizing components assists greatly in the D.C. restoration process of the receiver in amplifiers 122, 136, 138; since it obviates the tendency of the synchronizing components to paralyze the restoration action of these amplifiers.

Bandpass amplifier 39 is designed, as previously noted, to have a pass band of from 2.5–4 megacycles, and this amplifier selects the modulated chroma subcarrier as well as the reference signal bursts pedestalled on the line blanking pulses.

The amplified chroma subcarrier from amplifier 39 is impressed on delay line 40. Delay line 40 in the embodiment illustrated in Fig. 1 is constructed to have a length corresponding to a phase shift of 235° at the chroma subcarrier frequency. The input terminal 50 of the line is coupled to the blue demodulator 57; a point 90° down the line corresponding to the junction of coils 40*c*, 40*d* is connected to the red demodulator 59; and a point 135° down the line corresponding to the junction of coils 40*h*, 40*i* is connected to the green demodulator. Therefore, if the color reference signal impressed on the cathodes of the devices 57, 59, 61 is in phase opposition with the blue modulation of the chroma subcarrier at the input terminal of line 40, it will be in phase opposition with the red modulation at the junction of coils 40*c*, 40*d* (see Fig. 2), and it will be in phase opposition with the resultant of the red and blue modulations corresponding to the green vector at the junction of coils 40*h*, 40*i*. Therefore, under these conditions, the demodulator 41*a* produces the $(b-y)$ color-difference signal, demodulator 41*b* produces the $(r-y)$ color-difference signal, and demodulator 41*c* produces the $(g-y)$ color-difference signal.

To establish the phase relations discussed in the preceding paragraph, the input terminal 50 of delay line 40 is coupled to the color burst regenerator 80. The line synchronizing pulses supplied to the unit 80 over lead 13 are used therein to gate the color bursts supplied thereto from the input terminal 50 of delay line 40. The gated bursts are used in unit 80 to produce a color reference signal at the output terminals of the unit having the phase relationships discussed above with the modulations of the chroma subcarrier at the various points on line 40. Any phase discrepancies in the system can be compensated by shifting the lead to unit 80 along line 40 until the proper phasing between the reference signal and the chroma modulations is obtained.

The color reference signal from unit 80 is amplified in amplifier 87 and impressed on the cathodes of devices 57, 59, 61 by the connection from the top of coil 93 in coupling network 92—94. Network 99, 104 provides a positive cathode bias on devices 57, 59 and 61. This bias establishes the devices in class AB for the reference signal so that they may properly perform their demodulating function in the manner fully described in the copending application referred to previously herein.

In the manner described above, the phasing of the color subcarrier and the reference signal in device 57 is appropriate so that the device produces the $(b-y)$ color difference signal. The phasing of the color subcarrier and the reference signal in device 59 is such that device 59 produces the $(r-y)$ color difference signal. The phasing of the color subcarrier and the reference signal in device 61 is such that device 51 produces the $(g-y)$ color difference signal as a result of the interaction of the reference signal with the $(r-y)$ and $(b-y)$ modulations of the color subcarrier. The use of a separate demodulator for the $(g-y)$ color-difference signal is advantageous in that it renders this color-difference signal independent of any degradation of the detected other color-difference signals by the other color demodulators. This degradation is sometimes appreciable on the low level $(b-y)$ color-difference signal, and by the independent demodulation of the high level $(g-y)$ color-difference signal in the system of this invention, the latter signal is not affected by the unreliability of the former. Moreover, the independent demodulation of the $(g-y)$ color difference signals retains the D.C. information of that signal; and it also allows for the independent adjustment of all three color-difference signals.

The color memory line forms a low impedance source for the control electrodes of the color demodulators 57, 59 and 61, which is required for the efficient drive of the demodulators. The reference signal is directly applied with common phase to the cathodes of the demodulators and the varying load exhibited by the cathodes does not adversely affect the color demodulation. The reference signal has an appropriate amplitude, and the devices are biased to class B operation for the reference signal in the manner described. Therefore, the devices 57, 59 and 61 operate in the manner described in the copending application 372,697 (referred to previously herein) to recover the various color-difference signals.

The constant K networks in the output circuits of the demodulators 41*a*, 41*b*, 41*c* pass the color-difference signals with uniform response through respective coupling capacitors 113, 115, 117 to the lower ends of respective resistors 112, 114, 116.

The $(b-y)$ color-difference signal from device 57 is mixed with the $(y)$ signal from device 34 across the potentiometer formed by resistors 111 and 112 to produce the blue video signal at the variable tap on resistor 112. In the same manner, the red video signal is produced at the variable tap on resistor 114, and the green video signal is produced at the variable tap on resistor 116. The variable taps provide an independent color adjustment for each of the color video signals.

Amplifier 122 amplifies the blue video signal from the variable tap on resistor 112 and supplies that signal to the blue reproducer 133. The devices 119 and 121 in the amplifier are coupled for degenerative feedback operation by resistor 134 and capacitor 135. This renders the amplifier highly linear and independent of tube and power supply variations. Also, the amplifier has high gain and may be driven by the high impedance matrix 111, 112. The control electrode of device 121 is biased positively through resistor 130 so that the control electrode is driven positive by the blanking components of the luminance signal and the device functions as a D.C. restorer for the D.C. components of the color video signal. The amplifier is simple to align and includes only one peaking coil 131.

The green signal from the variable tap on resistor 116 is amplified in the green amplifier 136 which may be of similar construction to amplifier 122, and is applied thereby to the green reproducer 137. The red video signal from the movable tap from resistor 114 is amplified in the red amplifier 138, which may be of similar construction to the other two, and is applied thereby to the red reproducer 139.

The cathode of reproducer 133 is returned to the positive terminal B+ through resistor 140 so that voltage variations of the D.C. source have no adverse effect on the image reproduced by the reproducer. The accelerating electrode 133*c* is connected to the variable tap on resistor 141 so that the reproducer can be adjusted to cut off at the blanking level of the applied color video signal. Reproducers 137 and 139 can be connected in the same manner.

In the manner described above, the incoming color television signal is demodulated and the various color video signals are derived therefrom and supplied to the corresponding image reproducers so that the televised scene may be reproduced in full color.

In a constructed embodiment of the invention the following circuit constants were used, and these are listed herein merely by way of example and are not intended to limit the invention in any way:

| | |
|---|---|
| Resistor **111** | 1 kilo-ohm. |
| Resistor **112** | 10 kilo-ohms. |
| Resistor **114** | 10 kilo-ohms. |
| Resistor **116** | 10 kilo-ohms. |
| Resistor **120** | 1 megohm. |
| Capacitor **125** | 100 micromicrofarads. |
| Resistor **123** | 100 ohms. |
| Resistor **124** | 250 ohms. |
| Resistor **126** | 10 kilo-ohms. |
| Resistor **127** | 10 kilo-ohms. |
| Capacitor **128** | 10 microfarads. |
| Capacitor **129** | 0.1 microfarads. |
| Resistor **130** | 3.3 megohms. |
| Coil **131** | 100 microhenries. |
| Resistor **132** | 5 kilo-ohms. |
| Resistor **134** | 6.8 kilo-ohms. |
| Capacitor **135** | 4 microfarads. |
| Resistor **140** | 47 kilo-ohms. |
| Capacitor **43** | 100 micromicrofarads. |
| Resistor **44** | 10 kilo-ohms. |
| Resistor **45** | 220 kilo-ohms. |
| Capacitor **46** | 0.1 microfarads. |
| Device **42** | 6AH6. |
| Coil **40***a* | 4.3 microhenries. |
| Coils **40***b*—**40***h* | 8.5 microhenries (each). |
| Coil **40***i* | 4.3 microhenries. |
| Capacitor **40***j* | 42 micromicrofarads. |
| Capacitors **40***k*—**40***p* | 85 micromicrofarads (each). |
| Resistor **40***g* | 330 ohms. |
| Resistor **104** | 150 ohms. |
| Capacitor **99** | 0.1 microfarads. |
| Resistor **92** | 150 ohms. |
| Capacitor **94** | 270 micromicrofarads. |
| Coil **93** | 3.3 microhenries. |
| Coil **95** | 2 millihenries. |
| Coil **96** | 1 millihenry. |
| Resistor **97** | 6.8 kilo-ohms. |

Figs. 3*a*–3*c* show various types of delay lines that can be used for the color memory line 40 of Fig. 2. In the arrangement of Fig. 3*a* the line is 270° long. The red connection is made from the input terminal, the bursts are taken from a tap 90° down the line, the green connection is taken from a tap 145° down the line, and the blue connection is taken from a tap 270° down the line. These connections provide delays conforming with the diagram of Fig. 2, and in this manner, and when the various points on the line are connected to the color demodulators and burst regenerator of Fig. 2, the chroma subcarrier and the reference signal are supplied to the various chroma demodulators with appropriate phases so that the various color difference signals can be recovered in the respective chroma demodulators.

In the arrangement of Fig. 3*b*, the shortest possible line of 215° is used, and the green connection is made from the input terminal, the blue and burst connections are taken 125° down the line, and the red connection an additional 90° down the line. These connections also correspond to the phase relations shown in Fig. 2 so that appropriate phase relations exist in the various chroma demodulators for the selective recovery of the color difference signals.

The arrangement of Fig. 3*c* is preferred and is similar to the arrangements shown in Fig. 1, with the exception that the bursts are taken 180° down the line so as to be in phase with the (*b*—*y*) color-difference signal, the chroma demodulators responding to an inphase or 180° out-of-phase relation between the reference signal and the color difference signal to be recovered. Although the line of Fig. 3*c* is longer than the other two (235°), it is preferred because the blue signal, which is the weakest, is detected before it enters the line and is attenuated thereby.

The arrangement of Fig. 4 shows a modification of the chroma demodulators and delay line 40. In the latter embodiment the color memory or delay line 40 is replaced by a pair of lines 40*a*, 40*b*. The chrominance subcarrier and reference signal bursts are supplied to the input terminals 50*a* and 50*b* of the lines from a band-pass amplifier including discharge device 42*a* and through a balanced input circuit including a bifilar winding 200 whose center tap is grounded. Band-pass amplifier 42*a* is coupled to the receiver 10 in the same manner as the embodiment of Fig. 1 through high-pass filter 43, 44. The input terminal 50*a* is connected to the input terminal of burst regenerator 80 to supply the reference bursts thereto.

The input terminals 50*a* and 50*b* are connected respectively to a pair of rectifiers 201, 202 which are coupled together through a pair of capacitors 203, 204 shunted by a pair of resistors 205, 206. The common junction of capacitors 203, 204 is connected by lead 207 to the output circuit of burst regenerator 80; and the common junction of resistors 205, 206 is connected through a low-pass filter 208 to output terminal 209.

With the disclosed circuit, the chrominance subcarrier component is supplied to the devices 201, 202 in phase opposition and the reference signal is supplied thereto in like phase. Moreover, the reference signal is in phase opposition to the (*b*—*y*) modulation of the subcarrier and in phase quadrature with the (*r*—*y*) modulation. The reference signal is given an amplitude large as compared with the chrominance subcarrier.

As fully described in copending application 322,763 filed November 26, 1952 in the name of the present inventor and assigned to the present assignee, the demodulator formed by rectifiers 201, 202 recovers the (*b*—*y*) color-difference signal and supplies it to output terminal 209. Terminal 209, as in the embodiment of Fig. 1, is coupled to matrix potentiometer resistor 112 so that the blue video signal may be recovered.

The system of Fig. 4 includes a second pair of rectifiers 210 and 211 which are connected respectively to points on lines 40*a* and 40*b* spaced 90° down the lines from the input terminals 50*a*, 50*b*. Rectifiers 210 and 211 are connected together through capacitors 212, 213 shunted by resistors 214, 215. The common junction of the capacitors is connected to lead 207, and the common junction of the resistors is connected to output terminal 216 through a low-pass filter 217.

The demodulator including rectifiers 210, 211 operates in the same manner as the previous demodulator, except that the memory lines 40*a*, 40*b* establish the (*r*—*y*) modulation of the chrominance subcarrier in the appropriate phase for recovery by the latter demodulator. The (*r*—*y*) color-difference signal is produced at terminal 216 and is supplied (as in Fig. 1) to the matrix potentiometer resistor 114 so that the red video signal may be recovered.

A third pair of rectifiers 217, 218 is included in the system, and these rectifiers are connected respectively to points 235° down lines 40*a*, 40*b*. Rectifiers 217, 218 are coupled together through capacitors 219, 220 shunted by resistors 221, 222. The common junction of the capacitors is connected to lead 207, and the common junction of the resistors is connected through low-pass filter 223 to output terminal 224.

In the latter demodulator formed by rectifiers 217, 218, the color memory lines establish the appropriate phase relationships so that the (*g*—*y*) color-difference signal is recovered at output terminal 224. The latter signal is supplied to the matrix potentiometer resistor 116 of Fig. 1 so that the green video signal may be recovered.

The embodiment of Fig. 5 is similar to Fig. 4 except that the reference signal is applied to the rectifiers of each demodulator in phase opposition and the chrominance subcarrier is so applied in like phase. This calls for a balanced input circuit for the reference signal including a transformer 215 with a grounded center-tapped secondary, and requires but one color memory line 40.

In the latter embodiment, the reference signal is applied to the rectifiers in each demodulator in phase opposition over leads 207*a* and 207*b* connected from the respective rectifiers to the sides of the secondary of transformer 215, the primary of the transformer being coupled to the output circuit of burst regenerator 80 to derive the reference signal therefrom. The chrominance subcarrier is supplied to the respective junctions of capacitors 203, 204; 212, 213; and 219, 220 from the appropriate points on the color memory line 40. The various color-difference signals are produced at output terminals 209, 216, 224 for application to the color matrix of Fig. 1.

The invention provides, therefore, an improved television receiver in which the various chroma components are recovered and combined with the luminance component in an improved and simplified manner to obtain the desired color video signals for true and efficient reproduction of the televised scene in full color.

While particular embodiments of the invention have been shown and described, modifications may be made and it is intended in the appended claims to cover all such modifications as fall within the true spirit and scope of the invention.

I claim:

1. A color television receiver for utilizing a color television signal which includes a luminance signal component and a chrominance subcarrier component, said subcarrier component having a selected frequency and having a pair of different color-difference components modulated thereon in phase quadrature with one another, and which receiver produces a color image made up of a plurality of distinct colors, said receiver including in combination, a detector unit for demodulating the color television signal, a luminance channel coupled to said detector unit for translating the luminance component, a chrominance channel coupled to said detector unit for selecting and translating the chrominance subcarrier, a plurality of chroma demodulators included in said chrominance channel corresponding in number to the distinct colors in the color image, means for impressing a reference signal with like phase on all of said chroma demodulators with said reference signal having the frequency of the subcarrier and a selected phase relation with the color-difference components, a delay line included in said chrominance channel and through which the subcarrier is translated, means for connecting selected points on said delay line to respective ones of said chroma demodulators to impress said chrominance subcarrier on said chroma demodulators with selected different phase relations with respect to said reference signals to enable said chroma demodulators to recover corresponding ones of said color-difference components, said chroma demodulators each including a low pass output filter for filtering the respective color difference component, and means for combining the luminance signal component translated by said luminance channel with respective color-difference components from said low pass filters of said chroma demodulators to derive a plurality of distinct color signals.

2. A color television receiver for utilizing a color television signal which includes a luminance signal component and a chrominance subcarrier component, said subcarrier component having a selected frequency and having a plurality of different color-difference components amplitude modulated thereon with selected phase relations with one another, and which television signal further includes bursts of a reference component having the frequency of the subcarrier component and having a selected phase relation with the color-difference components, said receiver including in combination, a detector unit for demodulating the color-television signal, a luminance channel coupled to said detector unit for translating the luminance component, a chrominance channel coupled to said detector unit for selecting and translating the reference bursts and the chrominance subcarrier component, image reproducing means, a plurality of chroma demodulators included in said chrominance channel, circuit means responsive to the reference bursts for generating a reference signal having the frequency and phase of the reference bursts as applied thereto, means for impressing the reference signal from said circuit means with like phase on all of said chroma demodulators, a delay line included in said chrominance channel and through which the reference bursts and the subcarrier are translated, means connecting a selected point on said delay line to said circuit means to establish a selected phase relation between the reference signal generated thereby and the color-difference components, means connecting selected points on said delay line to respective ones of said chroma demodulators to impress said chrominance subcarrier on said chroma demodulators with selected different phase relations with respect to said reference signal to enable said chroma demodulators to recover corresponding ones of said color-difference components, said chroma demodulators each having a low pass output filter for passing the respective color difference component, potentiometer mixing means connecting the output of said luminance channel to said low pass output filter of each of said chroma demodulators to combine the luminance signal component translated by said luminance channel with respective color-difference components produced by said chroma demodulators to derive a plurality of distinct color signals, and means for impressing said color signals on said image reproducing means.

3. A color television receiver for utilizing a color television signal which includes a luminance signal component and a chrominance subcarrier component, said subcarrier component having a selected frequency and being amplitude modulated by a pair of color-difference components in phase quadrature with one another, and which television signal further includes bursts of a reference component having the frequency of the subcarrier component and being in phase quadrature with one of the color-difference components, said receiver including in combination, a detector unit for demodulating the color television signal; a luminance channel coupled to said detector unit for translating the luminance component; a chrominance channel coupled to said detector unit for selecting and translating the reference signal bursts and the chrominance subcarrier component; image reproducing means, first, second, and third chroma demodulators of the phase-detector type included in said chrominance channel; circuit means responsive to the reference bursts for generating a reference signal having the frequency and phase of the reference bursts applied thereto; means for impressing the reference signal from said circuit means with like phase on all of said chroma demodulators; a color memory delay line included in said chrominance channel and through which the reference bursts and the subcarrier are translated; means for connecting a point on said delay line to said circuit means to supply said reference bursts thereto and establish a predetermined phase relation between said reference signal impressed on said chroma demodulators and said chrominance subcarrier; means for connecting a selected point on said delay line to said first chroma demodulator so that the phase of one of said color-difference components coincides therein with the phase of said reference signal; means for connecting a point on said delay line spaced 90° from said selected point to said second chroma demodulator so that the phase of the other of said color-difference components coincides therein with the phase of said reference signal; means for connecting a further point on said delay line to said third chroma demodulator so that both said color-difference components have a selected phase relation therein with respect to said reference signal; individual potentiometer mixing means connecting the output of said luminance channel to each of said chroma demodulators to combine the luminance signal component translated by said luminance channel with respective color-difference components produced by said chroma demodulators to derive a plurality of distinct color video signals, amplifying means for impressing said color video signals on said image reproducing means, and each of said potentiometer mixing means having a variable tap for supplying the corresponding color video signal to said amplifying means.

4. A color television receiver for utilizing a color television signal which includes a chrominance subcarrier component having a selected frequency and being amplitude modulated by a pair of color components in phase quadrature with one another, and which further includes bursts of a reference signal having the frequency of the subcarrier component and being in phase quadrature with one of the color components, said receiver including in combination, a detector unit for demodulating the color television signal; a chrominance channel coupled to said detector unit for selecting and translating the reference signal bursts and the chrominance subcarrier component; first, second, and third chroma demodulators of the phase-detector type included in said chrominance channel; circuit means responsive to the reference bursts for generating a reference signal having the frequency and phase of the reference bursts applied thereto; means for impressing the reference signal from said circuit means with like phase on all of said chroma demodulators; a color memory delay line included in said chrominance channel and through which the reference bursts and the subcarrier are translated; means for connecting a point on said delay line to said circuit means to supply said reference bursts thereto and establish a predetermined phase relation between said reference signal impressed on said chroma demodulators and said chrominance subcarrier; means for connecting a selected point on said delay line to said first chroma demodulator so that the phase of one of said color components coincides therein with the phase of said reference signal; means for connecting a point on said delay line spaced 90° from said selected point to said second chroma demodulator so that the phase of the other of said color components coincides therein with the phase of the reference signal; and means for connecting a further point on said delay line to said third chroma demodulator so that both said color components have a selected phase relation therein with respect to said reference signal.

5. A color television receiver for utilizing a color television signal which includes a chrominance subcarrier component having a selected frequency and being amplitude modulated by a pair of color components in phase quadrature with one another, and which further includes bursts of a reference signal having the frequency of the subcarrier component and being in phase quadrature with one of the color components, said receiver including in combination, a detector unit for demodulating the color television signal; a chrominance channel coupled to said detector unit for selecting and translating the chrominance subcarrier component and the reference signal bursts; a plurality of chroma demodulators each including an electron discharge device having an anode, a cathode, and a control electrode; circuit means responsive to the reference bursts for generating a reference signal having the frequency and phase of the reference bursts applied thereto; means for impressing the reference signal from said circuit means with like phase on the cathodes of the electron discharge devices included in said chroma demodulators; a color memory delay line included in said chrominance channel and through which the reference bursts and the subcarrier are translated; means for connecting a point on said delay line to said circuit means to supply said reference bursts thereto and establish a predetermined phase relation between said reference signal impressed on said chroma demodulators and said chrominance subcarrier; means for connecting selected points on said delay line respectively to the control electrodes of the discharge devices included in said chroma demodulators to establish a different predetermined phase relationship between said chrominance subcarrier and said reference signal in each of said demodulators; means for biasing the discharge devices in said chroma demodulators to class B operation for said reference signal; and means for deriving the color components from the respective anodes of said discharge devices.

6. A color television receiver for utilizing a color television signal which includes a chrominance subcarrier component having a selected frequency and being amplitude modulated by a pair of color components in phase quadrature with one another, and which further includes bursts of a reference signal having the frequency of the subcarrier component and being in phase quadrature with one of the color components, said receiver including in combination, a detector unit for demodulating the color television signal; a chrominance channel coupled to said detector unit for selecting and translating the chrominance subcarrier component and the reference signal burst; a plurality of chroma demodulators each including a pair of rectifiers intercoupled by a pair of series-connected capacitors shunted by a pair of series-connected resistors; circuit means responsive to the reference bursts for generating a reference signal having the frequency and phase of the reference bursts applied thereto; means for impressing the reference signal from said circuit means with like phase on the common junction of said capacitors in each of said chroma demodulators; a pair of color memory delay lines of like characteristics included in said chrominance channel; means for connecting a point on one of said memory lines to said circuit means to supply said reference bursts thereto and establish a predetermined phase relation between said reference signal impressed on said chroma demodulators and said chrominance subcarrier; means for impressing the chrominance subcarrier and the reference bursts in phase opposition on said memory lines; means for connecting selected points on said memory lines to said rectifiers in each of said demodulators to establish a different predetermined phase relationship between said chrominance subcarrier and said reference signal in each of said chroma demodulators; and means for deriving the color components from the common junction of said resistors in respective ones of said chroma demodulators.

7. A color television receiver for utilizing a color television signal which includes a chrominance subcarrier component having a selected frequency and being amplitude modulated by a pair of color components in phase quadrature with one another, and which further includes bursts of a reference signal having the frequency of the subcarrier component and being in phase quadrature with one of the color components, said receiver including in combination, a detector unit for demodulating the color television signal; a chrominance channel coupled to said detector unit for selecting and translating the chrominance subcarrier component and the reference signal bursts; a plurality of chroma demodulators each including a pair of rectifiers intercoupled by a pair of series-connected capacitors shunted by a pair of series-connected resistors; circuit means responsive to the reference bursts for generating a reference signal having the frequency and phase of the reference bursts applied thereto; means for impressing the reference signal from said circuit means in phase opposition on said rectifiers in each of said chroma demodulators; a color memory delay line included in said chrominance channel and through which said chrominance sub-carrier and said reference bursts are translated; means for connecting a point on said memory line to said circuit means to supply said reference bursts thereto and establish a predetermined phase relation between said reference signal impressed on said chroma demodulators and said chrominance subcarrier; means for connecting selected points on said memory line to the common junction of said capacitors in each of said chroma demodulators to establish a different predetermined phase relationship between said chrominance subcarrier and said reference signal in each of said chroma demodulators; and means for deriving the color components from the common junction of said resistors in respective ones of said chroma demodulators.

8. A color television receiver for utilizing a color television signal which includes a chrominance subcarrier having a selected frequency and having a pair of different color components amplitude modulated thereon with a phase quadrature relation to one another, said receiver including in combination; a detector circuit for demodulating the color television signal, a chrominance channel coupled to said detector unit for selecting and translating the chrominance subcarrier; first, second, and third chroma demodulators included in said chrominance channel; means for generating a reference signal and for impressing said reference signal with like phase on all of said chroma demodulators, said reference signal having the frequency of the subcarrier and a selected phase relation with the color components modulated thereon; means included in said chrominance channel for supplying said chrominance subcarrier to said first and second chroma demodulators in phase quadrature relation and with a selected phase with respect to said reference signal to enable said first and second chroma demodulators respectively to recover said first and second color components; and means for impressing said chroma subcarrier on said third demodulator with a selected phase with respect to said reference signal to enable said third demodulator to recover a third color component.

9. A color television receiver for utilizing a color television signal which includes a chrominance subcarrier having a selected frequency and having a plurality of different color-difference components modulated thereon with selected phase relations with respect to one another and which also includes a luminance signal component having blanking pulses with synchronizing pulses pedestaled on such blanking pedestals, said receiver including in combination; a detector unit for demodulating the color television signal; a luminance channel coupled to said detector unit for translating the luminance component of the detected television signal, circuit means included in said luminance channel for removing said synchronizing pulses from said blanking pulses, chrominance channel coupled to said detector for selecting and translating the chrominance subcarrier, a plurality of chroma demodulators included in said chrominance channel, means for impressing said chrominance subcarrier on said chroma demodulators, means for producing a reference signal having the frequency of the chrominance subcarrier, means for impressing such reference signal on said chroma demodulators to cause said demodulators to produce different color-difference signals; means for combining the luminance signal component translated by said luminance channel with respective color-difference signals produecd by said chroma demodulators to derive a plurality of different chroma signals; image reproducer means; and amplifier means for supplying said different chroma signals respectively to said image reproducer means, said amplifier means having a section for each of said chroma signals and each such section including a pair of cascade-connected degenerative discharge devices for amplifying a corresponding one of said chroma signals and responsive to the blanking pulses to insert a direct-current component in such chroma signal.

10. A television receiver for utilizing a television signal which includes a luminance signal component having blanking pulses with synchronizing pulse pedestaled on such blanking pulses, said receiver including in combination, a detector unit for demodulating the television signal, a luminance channel coupled to said detector for translating the luminance component of the detected television signal, circuit means included in said luminance channel for removing said synchronizing pulses from said blanking pulses, cathode-ray image reproducer means having input electrodes for controlling the intensity of the cathode-ray beam therein, and degenerative amplifier means interposed between said circuit means and said input electrodes of said image reproducer, said amplifier means including an electron discharge device responsive to the blanking pulses to insert a direct-current component in the signal amplified thereby.

11. A color television receiver for utilizing a color television signal which includes a chrominance subcarrier having a selected frequency and having first and second different color components amplitude modulated thereon with a phase quadrature relation to one another, said receiver including in combination, a detector circuit for demodulating the color television signal, a chrominance channel coupled to said detector unit for selecting and translating the chrominance subcarrier, at least two chroma demodulators included in said chrominance channel, means for developing a reference signal having the frequency of the chrominance subcarrier, means included in said chrominance channel for supplying said chrominance subcarrier to said chroma demodulators, means for supplying said reference signal to the first of said chroma demodulators so that said reference signal is in phase with said first color component in said first chroma demodulator, an output circuit coupled to said first chroma demodulator for deriving said first color component therefrom, means for supplying said reference signal to the second of said chroma demodulators so that said reference signal has a predetermined out-of-phase relation with said first and second color components in said second chroma demodulator, and an output circuit coupled to said second chroma demodulator for deriving a third color component different from said first and second color components from said second chroma demodulator.

12. A color television receiver for utilizing a color television signal which includes a chrominance subcarrier having a selected frequency and having a plurality of different color-difference components modulated thereon with selected phase relations with respect to one another and which also includes a luminance signal component having blanking pulses with synchronizing pulses pedestaled on such blanking pedestals, said receiver including in combination; a detector unit for demodulating the color television signal; a luminance channel coupled to said detector unit for translating the luminance component of the detected television signal, circuit means included in said luminance channel for removing said synchronizing pulses from said blanking pulses; a chrominance channel coupled to said detector for selecting and translating the chrominance subcarrier, a plurality of chroma demodulators included in said chrominance channel, means for impressing said chrominance subcarrier on said chroma demodulators, means for producing a reference signal having the frequency of the chrominance subcarrier, means for impressing such reference signal on said chroma demodulators to cause said demodulators to produce different color-difference signals; means for combining the luminance signal component translated by said luminance channel with respective color-difference signals produced by said chroma demodulators to derive a plurality of different chroma signals; image reproducer means having input electrodes for controlling the intensity of the cathode ray beam therein; and degenerative amplifier means for supplying said different chroma signals respectively to said input electrodes of said image reproducer means, said amplifier means having a section for amplifying each of said chroma signals and responsive to the blanking pulses to insert a direct-current component in such chroma signal.

References Cited in the file of this patent

FOREIGN PATENTS

| | | |
|---|---|---|
| 1,065,692 | France | May 28, 1954 |
| 759,139 | Great Britain | Oct. 17, 1956 |